United States Patent [19]
Hecht

[11] Patent Number: 6,016,605
[45] Date of Patent: Jan. 25, 2000

[54] DEVICE FOR DETERMINING A ROTARY ANGLE

[75] Inventor: Hans Hecht, Korntal, Germany

[73] Assignee: Robert Bosch GmbH, Stuttgart, Germany

[21] Appl. No.: 08/044,146

[22] Filed: Apr. 7, 1993

[30] Foreign Application Priority Data

Apr. 7, 1992 [DE] Germany .............................. 42 11 614

[51] Int. Cl.[7] ...................................................... G01B 7/30
[52] U.S. Cl. ............................... 33/1 PT; 33/1 N; 33/534; 324/207.25
[58] Field of Search ..................... 33/1 N, 1 PT, 33/DIG. 1, 534; 324/207.25

[56] References Cited

U.S. PATENT DOCUMENTS

| 5,126,655 | 6/1992 | Hachtel et al. ................. 324/207.25 X |
| 5,263,258 | 11/1993 | Dobler et al. ........................ 33/1 PT X |

FOREIGN PATENT DOCUMENTS

| 3815074 | 11/1989 | Germany . |
| 4001544 | 7/1991 | Germany . |
| 1482705 | 8/1977 | United Kingdom . |
| 1576850 | 10/1980 | United Kingdom . |
| 2240185 | 7/1991 | United Kingdom .............. 324/207.25 |

*Primary Examiner*—Andrew Hirshfeld
*Attorney, Agent, or Firm*—Michael J. Striker

[57] ABSTRACT

A device for contactless determination of a rotary angle has a coil body, sensor coils arranged on the coil body so that their inductivity and alternating current resistance values vary in dependence on a relative change of the size of regions of a sleeve-shaped measuring part composed of electrically conductive and/or ferromagnetic material which are associated with the sensor coils, at least one coil being formed as a wire coil which is arranged on a side of the coil body facing the measuring part. The at least one coil has several coil regions extending in a circumferential direction and parallel to an outer surface of the coil body, and in the regions of the coil a winding direction of the at least one coil changes on the catches.

3 Claims, 2 Drawing Sheets

DEVICE FOR DETERMINING A ROTARY ANGLE

BACKGROUND OF THE INVENTION

The present invention relates to a measuring device for determination of a rotary angle. In particular, it relates to a device for contactless determination of a rotary angle by means of sensor coils arranged on a coil body and having values which are changeable in dependence upon regions of a measuring part associated with the sensor coils.

Devices of the above mentioned general type are known in the art. Such devices are disclosed for example in the German document DE-OS 40 01 544.0. The devices disclosed in this reference include a coil body composed of two cores which have an approximately semicrescent shaped cross-section and are offset relative to one another in an axial direction. The cores are also offset relative to one another in a radial direction by 180 degrees so that both flat surfaces of the cores face one another. A coil is wound on each core in a peripheral direction and is in an operative connection with a measuring part composed of electrically conducting and/or ferromagnetic material. The winding of the coil over the whole periphery of the core forms a region which faces the measuring part, and a coil region located on the lower side of the measuring core. The coil region arranged on the lower side is excluded from the measuring value determination or in other words it reduces the useable part of the inductivity change. Thereby the measuring sensitivity of the measuring device is reduced. Furthermore, only the region which faces the coil is available for producing the measuring signal. Also, the coils arranged on the individual cores have a relatively high temperature drift.

The German document DE-PS 38 15 074 discloses a measuring device in which several coils are arranged on the inner side of the sleeve and are in operative connection with a measuring part movable in the sleeve. No wire coils can be wound on the inner side of this sleeve. The measuring region with the use of a throttle valve transmitter must be more than 100 degrees. This cannot be obtained with an arrangement of four coils.

SUMMARY OF THE INVENTION

Accordingly, it is an object of the present invention to provide a measuring device for determining a rotary angle, which avoids the disadvantages of the prior art.

In keeping with these objects and with others which will become apparent hereinafter, one feature of the present invention resides, briefly stated, in a measuring device for contactless determination of a rotary angle by means of sensor coils arranged on a coil body and having inductivity and eddy current resistance values variable due to the relative change of the size of the regions of electrically conductive and/or ferromagnetic sleeve-shaped measuring parts which are associated with the sensor coils, wherein in accordance with the present invention at least one coil is a wire coil which is arranged on the side of the coil body associated with the measuring parts, said at least one coil has several regions extending in the circumferential direction and parallel to the surface of the coil body, and in said regions the winding direction of the coil changes on the catches.

When the device is designed in accordance with the present invention, it has the advantage that approximately the whole coil length contributes to the change of the inductivity of the measuring coil. Therefore a high measuring sensitivity is obtained. Furthermore, the measuring coil is mirror-symmetrical relative to the central plane, and thereby a very uniform temperature passage in the both halves of the measuring coil is obtained and a very efficient temperature compensation of the produced measuring signal is achieved. Furthermore, a measuring signal increase is obtained since a great, efficient coil surface is provided, so that the whole coil surface of the measuring part is utilized. Further, approximately no measuring signal faults occur due to the axial displacements of the measuring part relative to the measuring coil. The measuring faults are caused in the conventional measuring devices by the carrier of the measuring part arranged on the shaft. The thusly produced measuring fault is efficiently suppressed in the inventive measuring device since the side of the carrier which faces the coil body acts on both coils in the same way. Due to the structural design on the circumferential surface of the coil body it is possible to wind a wire coil on the bent outer side of the coil body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
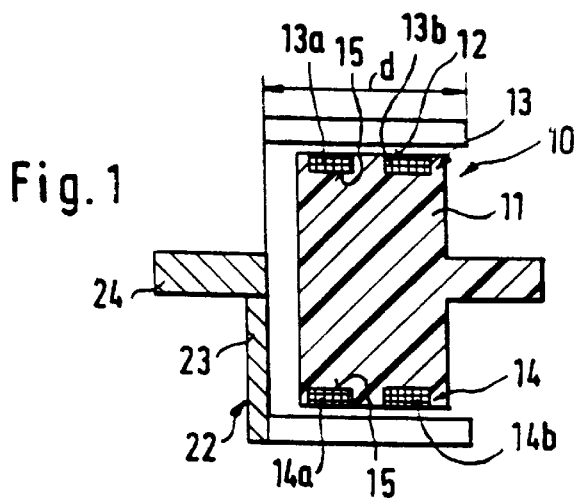
FIG. 1 is a view showing a longitudinal section of a device for determining a rotary angle in accordance with the present invention.
Figure 2:
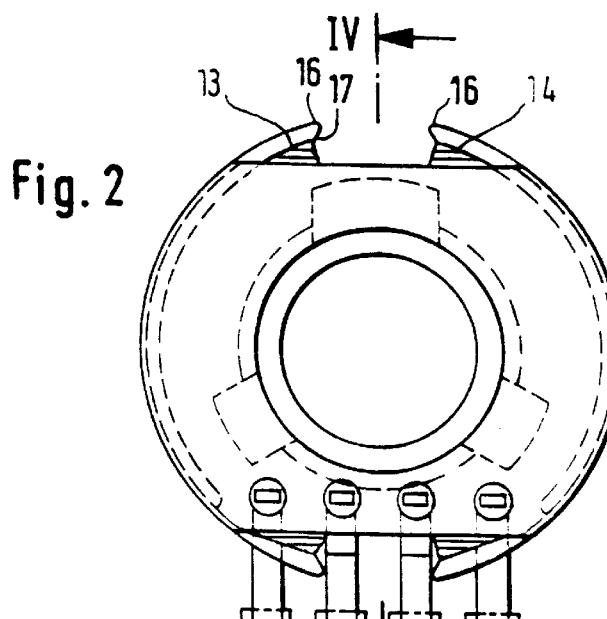
FIG. 2 is a side view of a coil body of another embodiment of the inventive device.

FIG. 1 shows a sensor which is identified with reference numeral 10 and has a coil body 11 which is composed for example of an electrically non-conductive material. Two diametrically opposite coils 13 and 14 are arranged on the outer surface 12 of the coil body 11 in a circumferential direction. Their joint coil region is located on the outer surface 12 of the coil body 11. FIG. 1 shows regions 13a and 14a which extend in one direction, and regions 13b and 14b which extend in an opposite direction. FIG. 2 shows another embodiment of the coil body, with a central opening.

For mounting the coils 13 and 14 on the outer surface 12 of the coil body 11, twelve grooves 15 are provided on the outer surface. The grooves have a substantially rectangular or an elliptic shape, and both regions extending in the circumferential direction have an angular region of approximately 100 degrees. It is especially advantageous to use in the device wire coils. Several catches 16 are provided at the edge of the grooves. They somewhat overlap with a projection 17, so that the coils 13, 14 cannot slide out of the grooves 15 or eventually slide off the catches 16.

Figure 3:
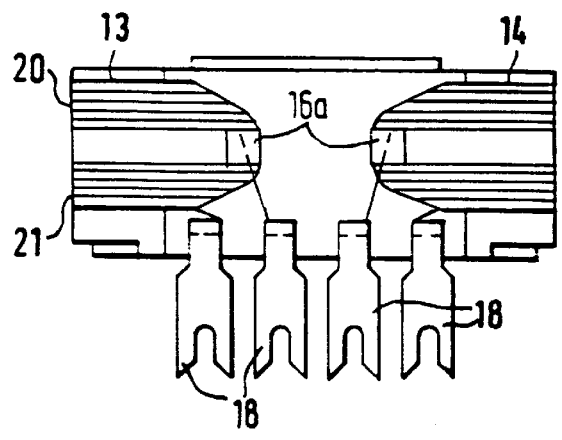
FIG. 3 is a view showing a further modification of a detail of the inventive device.
Figure 5:
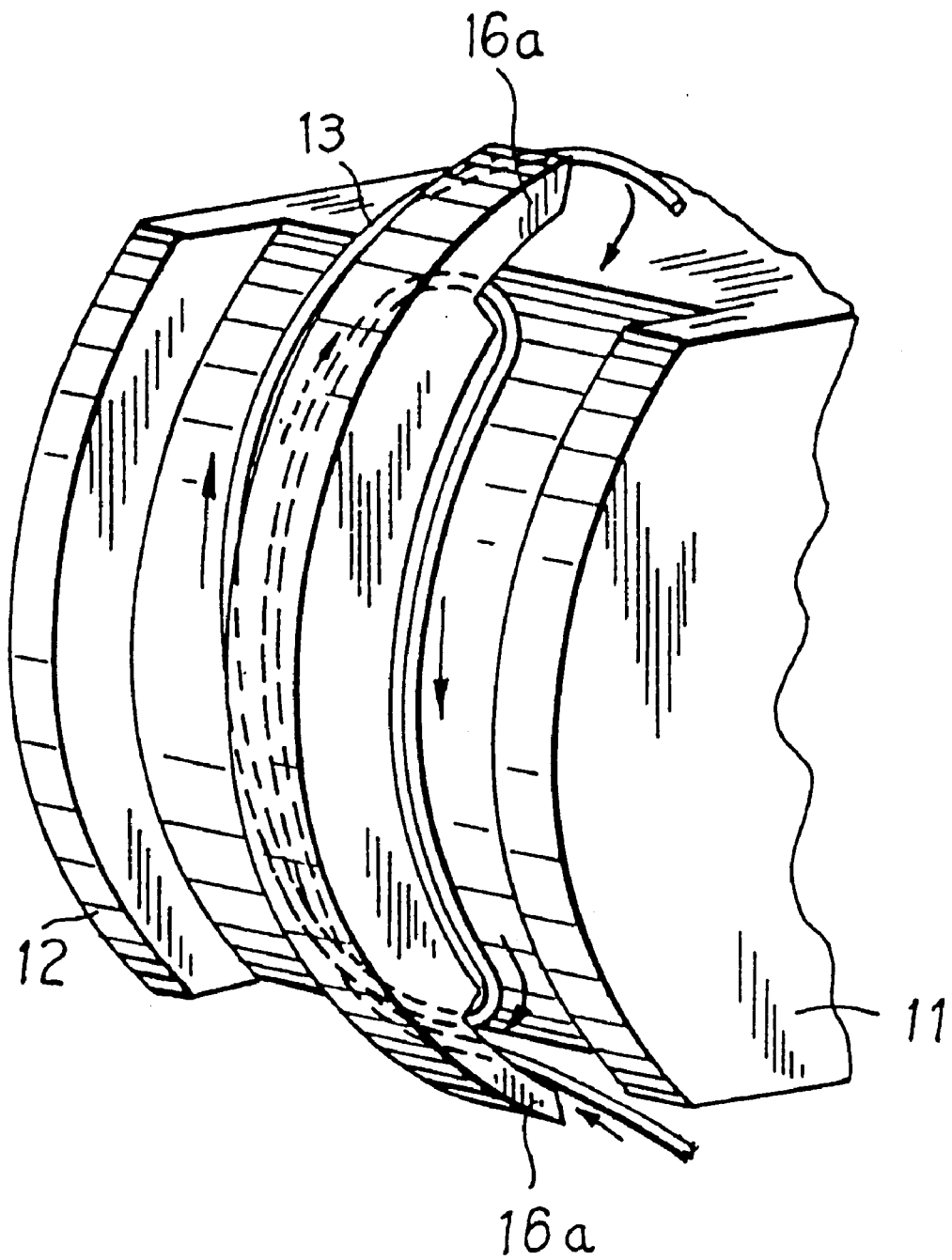
FIG. 5 is a perspective view showing a portion of the inventive device.

In a different embodiment shown in FIG. 3 the catches 16a extend outwardly on the outer surface 12 of the coil body 11 in a radial direction, for winding the coils 13 and 14.

Figure 4:
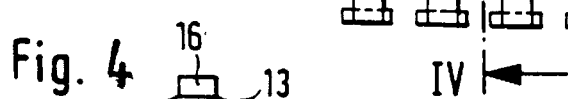
FIG. 4 is a view showing a section taken in direction IV—IV in FIG. 2.

Further, as can be seen from FIG. 3, the wires of the coils 13 and 14 are arranged on connecting contacts 18 and guided around the catch 16a. As can be seen from FIGS. 2 and 4, the wire of the coil passes around the diametrically opposite catch 16 and under its projection 17 and then again back to the other projection, so that two adjoining, approximately parallel regions 20, 21 of the coils 13, 14 are produced. It is to be understood that it is also possible to guide the wires many times so that several adjoining regions can be produced. With an even number of these regions, especially in the case of two regions, a very efficient temperature compensation of the produced measuring values is obtained. The coils can be wound one time or many times. The end of the wire of the corresponding coil is connected again with a contact 18. When the coils 13, 14 are arranged in a groove 15 as shown in FIG. 1, the catch 16 and the projection 17 serve for maintaining a reliable arrangement of the coil in the groove. When the winding of the coils 13, 14 is sufficiently tight, the catches can be dispensed with. In all above described cases, the regions 20, 21 of the coils 13, 14 are wound always parallel to the outer surface of the coil body 11.

For producing a measuring signal, a measuring part 22 which is composed of an electrically conductive (ferromagnetic and/or non-ferromagnetic material) or a ferromagnetic material is arranged around the coil body 11 at a small distance from it. The measuring part 22 is formed as a sleeve magnet and covers approximately half circumference of the coil body as considered in a circumferential direction. The size of the measuring part depends on the angular region to be measured and on the length of the measuring coils 13, 14. The axial length d of the measuring part 21 must have preferably at least the width of the both coils 13, 14 and the region of the coil body 11 provided between the coils. The measuring part 22 is connected with a shaft 24 whose rotary movement must be determined. The connection is performed through a disc-shaped or a bar-shaped carrier 23. The shaft 24 can also be connected with a not shown further structural part, so that the rotary movement of this structural part is determined. It is especially advantageous to use the measuring device for determination of the throttle valve position in the internal combustion engines.

In the initial position the measuring part 22 is oriented so that it overlaps both coils 13, 14 with the same size of the circumferential surfaces. Thereby the measurements can be performed in both rotary directions. The sensor 10 can operate in accordance with the inductive principle and/or in accordance with the eddy current principle wherein in both cases an alternating current flows through the coils 13, 14. For performing the measurements, the measuring part 22 is turned or in other words moved over a desired angular region around the coil body 11. The eddy current principle will be illustrated hereinbelow. A magnetic alternating field is produced on the coils 13, 14 and causes eddy current on the metallic surface of the measuring part, which can be composed for example of aluminum. The greater the surface of the measuring part 22 through which the magnetic field passes, the more eddy currents are produced. Further, the magnitude of the produced eddy current is dependent on the material of the measuring part 22 as well as on the distance from the coil 13 or 14 to the outer surface of the measuring part 22. Due to the eddy current produced on the measuring part 22, the coil alternating current resistance changes and this is utilized for producing the measuring signal. Since the coil inductivity simultaneously reduces, this inductivity change can also be utilized for producing the measuring signal (coil inductivity evaluating method). During the rotary movement of the measuring part 22 the outer surface of the measuring part 22 associated with the coils 13 and 14 is changed in opposite direction. Thereby the outer surface of the measuring part 22 associated with the coil 33 for example is increased by such a magnitude, by which it is reduced relative to the other coil 14. The both coils 13, 14 in the case when the coil alternating current-resistance evaluating method is used, are connected for example in a Wheat stone semi-bridge circuit. Thereby the measuring faults which occur simultaneously and act in opposite directions in the coils 13, 14 are compensated. Due to both parallel regions 20, 21 of both coils 13, 14, the measuring faults caused for example by temperature fluctuations are compensated in the same coil. It is to be understood that it is also possible to arrange on the outer surface of the coil body not only two diametrically opposite coils, but also more coils.

It will be understood that each of the elements described above, or two or more together, may also find a useful application in other types of constructions differing from the types described above.

While the invention has been illustrated and described as embodied in a device for determining a rotary angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for contactless determination of a rotary angle comprising a coil body; sensor coils arranged on said coil body so that their inductivity and alternating current resistance values vary in dependence on a relative change of the size of regions of a sleeve-shaped measuring part surrounding said coil body and composed of at least one of an electrically conductive material and a ferromagnetic material which are associated with said sensor coils, at least one of said coils being formed as a wire coil which is arranged completely as a whole on a side of said coil body facing the measuring part, said at least one coil having several wire coil regions extending in a circumferential direction and parallel to an outer surface of said coil body; and catches arranged on said outer surface of said coil body, said regions of said at least one coil extending between said catches from one of said catches to another of said catches and vice versa.

2. A device as defined in claim 1, wherein said coil body has grooves formed in said outer surface, said coils being arranged in said grooves.

3. A device as defined in claim 1, wherein said catches have projections which overlap said coils.

* * * * *